Feb. 3, 1970        L. GYONGYOSI        3,493,061
APPARATUS FOR STORING AND HANDLING DRILL RODS
Filed May 2, 1967        3 Sheets-Sheet 1

INVENTOR
LASZLO GYONGYOSI
BY Frank H Thomson
ATTORNEY

INVENTOR
LASZLO GYONGYOSI

Feb. 3, 1970   L. GYONGYOSI   3,493,061
APPARATUS FOR STORING AND HANDLING DRILL RODS
Filed May 2, 1967   3 Sheets-Sheet 3

INVENTOR
*LASZLO GYONGYOSI*

BY *Frank H. Thomson*

ATTORNEY

_United States Patent Office_

3,493,061
Patented Feb. 3, 1970

3,493,061
APPARATUS FOR STORING AND HANDLING DRILL RODS
Laszlo Gyongyosi, Easton, Pa., assignor to Ingersoll-Rand Company, New York, N.Y., a corporation of New Jersey
Filed May 2, 1967, Ser. No. 635,509
Int. Cl. E21b 19/14, 19/00
U.S. Cl. 175—52         14 Claims

ABSTRACT OF THE DISCLOSURE

A drill rod changer of the "Lazy Susan" type which is swingably mounted on a drill tower. The apparatus includes a rod retainer, a rod rack and indexing means. The indexing means positively aligns the drill rod which is to be connected to the drill string with the hole being drilled. The rod retainer and rod rack include cut-out portions which permit the starter rod to remain connected to the rotary drilling head during transportation.

Background of the invention

This invention relates to drill rod changers and more particularly a drill rod changer of the "Lazy Susan" type. It is particularly well adapted for use on transportable drilling units where it may be necessary to drill unusually deep holes.

Some prior drill rod changers of the "Lazy Susan" type have the disadvantage that one of the rods on the changer must be used as a starter rod. In normal drilling practice it is not desirable to remove the starter rod from the rotary drilling head when the drilling rig is to be moved since it necessitates the additional step of adding the starter rod to the drilling head when a new hole is started. In the normal transportation position of a transportable drilling rig, the rod changer is swung to the rod changing position so that it faces the drill tower. The drill tower and rod changer are then placed in a horizontal position. With the rod changer facing the drill tower, a compact unit is achieved. With prior drill rod changers, the starter rod must be removed before this compact transportation position may be achieved. With the present invention, the starter rod need not be removed from the rotary drilling head when the drilling rig is to be moved. In many prior drill rod storage and handling apparatus, the drill rod is held on the storage rack by means of a latching mechanism. The latching mechanism is actuated by weight of the drill rod acting on a control lever which opens and closes the latching mechanism. An additional problem with prior drill rod changers of this type is that the number of rods which can be carried by the rack is limited. This is because a large amount of space is taken up by the weight actuated latching mechanism used in some prior drill rod changers to hold the rods in place. A further problem is that additional rods cannot be added to the rod changer until all of the rods are removed. In some prior drill rod changers the rod to be added to the drill string is not always properly aligned with the existing drill string or hole being drilled since the rod changer is not in direct contact with the drill string. When the rod rack is swung into the rod changing position, it often has to be adjusted to insure that when the rotary drilling head picks up a drill rod from the rod rack, the rod is properly aligned with the drill string.

Summary

It is therefore the principal object of this invention to provide a drill rod storage and handling device which insures positive alignment of the rod to be added to the drill string with the existing drill string.

It is another object of this invention to provide a drill rod storage and handling apparatus in which the addition of a drill rod to or the removal of a drill rod from the storage apparatus depends solely on the position of the rod relative to the storage apparatus.

It it another object of this invention to provide a drill rod storage and handling apparatus which increases the number of rods which may be used with the changer.

It is another object of this invention to provide a drill rod changer which permits a more compact drilling rig during transportation.

In general, these and other objects are carried out by providing a drill rod storing and handling device for use in combination with apparatus for drilling a hole comprising a support mounted for swinging movement relative to the drilling apparatus. There is a rack mounted on the support for holding a plurality of drill rods and rotatable about its own axis. Indexing means is provided for rotating the rack a predetermined amount and for positively aligning one of the drill rods on the rack with the longitudinal axis of the hole being drilled.

Brief description of the drawing

The foregoing and other objects will become apparent from the following description and drawings wherein.

Description of the preferred embodiment

Figure 1:
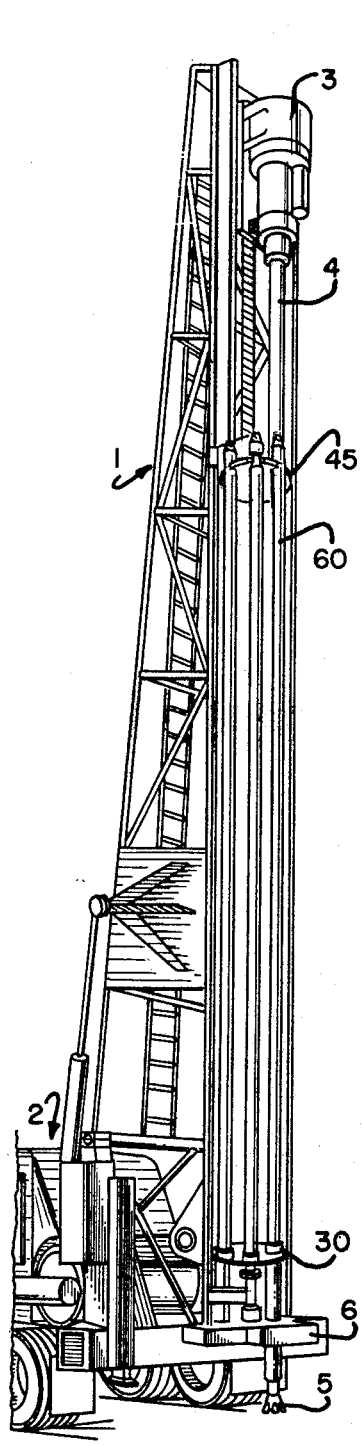
FIG. 1 is a perspective view of a drilling apparatus employing the present invention.

Referring to the drawings, there is shown a drilling tower generally indicated at 1 which is mounted on a mobile unit 2 such as a truck. There is a rotary drilling head 3 movably mounted on the drill tower 1 and a starter rod 4 is connected to the rotary motor 3. A drill bit 5 is connected to the lower end of the starter rod 4. If desired, a conventional down-the-hole drill may be attached to the rod 4. The drilling apparatus includes a base generally indicated at 6.

Figure 3:
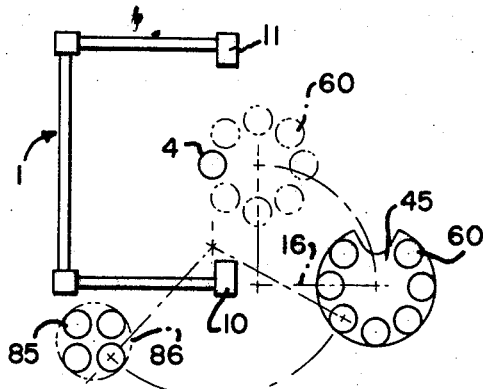
FIG. 3 is a generally schematic view of apparatus for adding drill rods to the drill rod changer.
Figure 2:
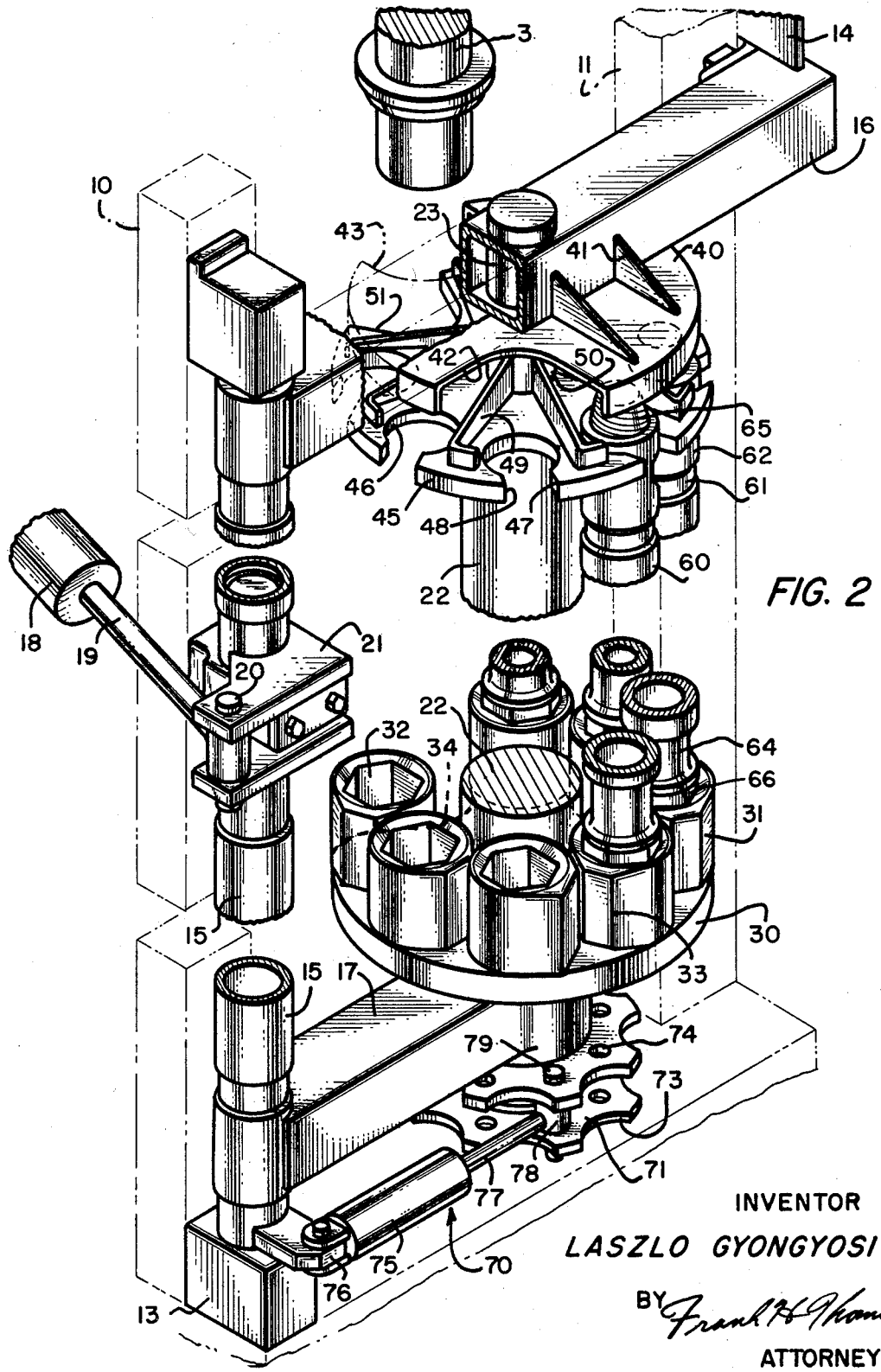
FIG. 2 is a perspective view of one embodiment of this invention with certain parts being broken away.

The drill tower 1 has a pair of tower legs 10 and 11 and is preferably in a C-shape. The leg 10 includes a pair of bearings 12 and 13 secured thereto and the leg 11 includes a guide bar 14. A main shaft 15 extends between the bearings 12 and 13 and is adapted to swing approximately 90° relative to the leg 10. The main shaft 15 has an upper arm 16 and a lower arm 17 extending perpendicular to the axis of the shaft 15. As is shown in FIG. 2, there are means for rotating the main shaft 15 and arms 16 and 17 90° relative to the leg 10, i.e., from the position shown in FIG. 2 to a position 90° in a clockwise direction (FIG. 3). This swinging means includes a cylinder 18 having a piston and piston rod 19 moveable therein. Fluid under pressure is supplied to the cylinder 18 to extend or retract the piston 19. The outer end of the piston rod 19 is connected to a holder or keying means 21 by a pin 20. The holder 21 is firmly fixed to the main shaft 15. The full stroke of the piston 19 swings the shaft 15 and arms 16 and 17 90° relative to the leg 10.

Figure 6:
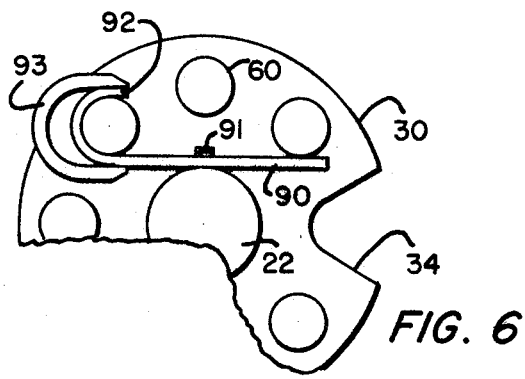
FIG. 6 is a detail of a portion of this invention.
Figure 4:
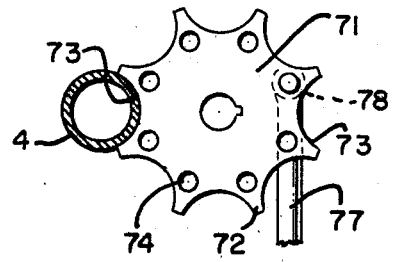
FIG. 4 is a detail of a portion of this invention.

A rod holder shaft 22 extends between upper arm 16 and the lower arm 17 and is supported in a bearing 23 in the upper arm 16 and a bearing (not shown) in the lower arm 17. A drill rod rack plate, generally indicated at 30, is mounted on the rod holder shaft 22 adjacent the lower arm 17. There are a plurality of cups 31 rotatably mounted on the outer perimeter of the plate 30. These cups have an internal hex generally indicated at 32 for receiving the hexagonal end of the drill rods and a lobe 33 on the outside. The plate 30 has a starter rod cut-out indicated at 34 (FIG. 6). This cut-out is adapted to allow the starter rod 4 to be cleared by the rod rack plate 30 during transportation as will become apparent hereinafter.

A rod cover plate 40 is mounted on the upper arm 16. This plate includes support braces 41 for securing the cover plate 40 to the arm 16. The cover has a cut-out portion 42 which allows additional rods to be added to the rack and a guide cut-out 43 to clear the starter rod. The cut-out 43 is positioned approximately 120° away from the cut-out 42.

A drill rod retainer plate 45 is mounted on the rod holder shaft 22 and positioned below the cover plate 40. Plate 45 is adapted to rotate with the holder shaft 22 relative to the arm 16 and cover 40. The rod retainer 45 has a plurality of key-hole cut-outs which include drill rod holes generally indicated at 46 corresponding in number and position to the cups 31. Each of the holes 46 has a slot 47 which provides fingers 48 to retain the drill rod within the rod holes 46 and to permit the drill rods to be removed from the rack. The drill retainer 45 includes bracing 49 and a hub 50 securing the plate 45 to the shaft 22. There is a starter rod cut-out 51 which is aligned with the cut-out 34 on the rack plate 30. This cut-out is more clearly shown in FIG. 5.

A plurality of drill rods generally indicated at 60 is mounted on the "Lazy Susan" and include a hexagonal end 66 which is adapted to fit into the internal hex 32 of the cups 31. The upper end of the rods include a reduced diameter portion 61 which is of a size such that it will slide through the opening 47 past fingers 48 as is apparent from FIG. 5. The top of each drill rod includes a nut end 63 and a holder portion 62 which fits into the holes 46 but larger than the opening 47. The top of the drill is threaded at 65 to allow the rotary drill head 3 to pick up the drill rods and permit drill rods to be connected to each other in end to end relation to form a drill string.

Indexing means 70 is provided below the lower arm 17. The indexing means includes an indexing or sprocket wheel 71. This sprocket wheel has sprocket spokes 72 and sprocket guides or circular cut-outs 73. A hole 74 is aligned with each of the spokes 72. A pneumatic or hydraulic cylinder 75 is connected to the main shaft 15 by means of a pin 76. As the carriage or rod changer is moved from the rod changing position to the drilling position, the rack will not be rotated. A piston rod 77 is reciprocally mounted in the cylinder 75 and has a ball 78 and a pin 79 adapted to slide through the holes 74 and ball 78. As the piston rod 77 is extended and retracted, the sprocket wheel 71 and thus the rod holder shaft 22, drill rod rack plate 30, drill rod retainer 45, and all the drill rods will rotate one position. The stroke of piston rod 77 is equal to the circumferential distance between the two sprocket guide openings 73 which is equal to the distances between the longitudinal axis of the cups 31 and drill rods 60.

Figure 5:
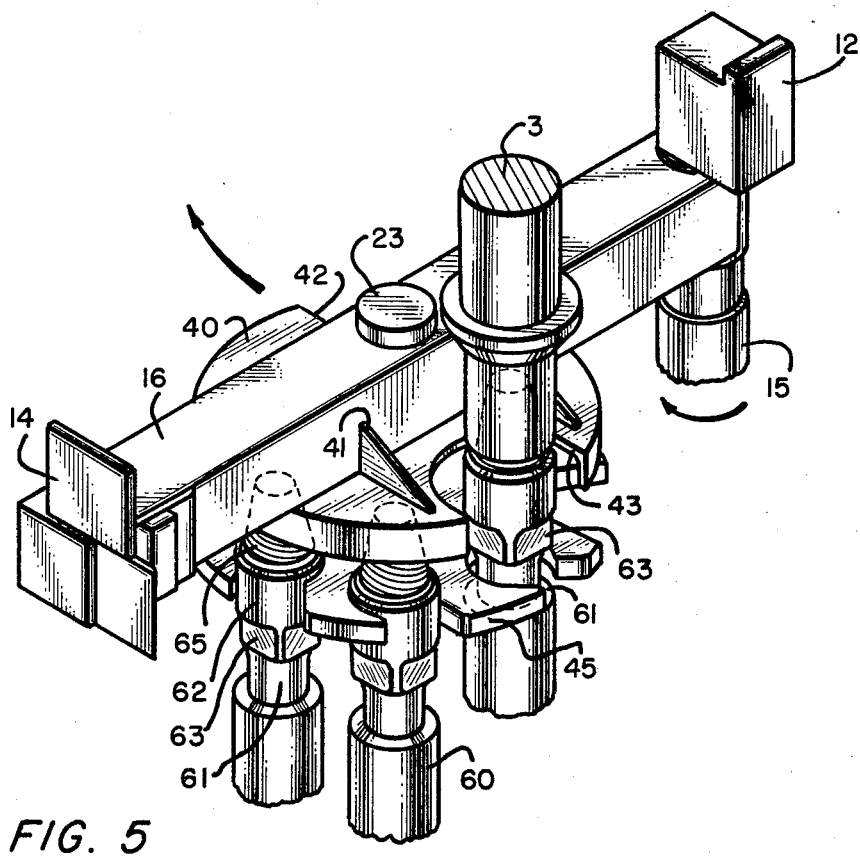
FIG. 5 is a fragmentary perspective of a portion of FIG. 2 looking in a different direction and showing a drill rod being removed.

During drilling operations the "Lazy Susan" rod changer is in a position 90° clockwise relative to the position shown in FIG. 2. A starter rod 4 extends from the rotary drilling head direct to the drill bit 5. As is conventional in drilling apparatus of this type, the rotary head rotates the drill string or starter rod 4 until a hole is bored to a depth nearly equal to the length of the starter rod 4. A portion of the starter rod or drill string extends out of the ground above the hole. The rotary drilling head 3 is then raised to a height greater than the length of a drill rod. Fluid under pressure is applied to the cylinder 18 to extend rod 19 and swing the drill handling apparatus 90° about the leg 10 to the rod changing position shown in FIG. 2. With this invention, the arms 16 and 17 swing until one of the sprocket cut-outs 73 engages the starter rod 4 extending above the ground. Sufficient clearance is provided between the pin 79 and holes 74 so that the sprocket wheel may move freely within a limit. This insures that the cut-outs 73 will conform to the drill string if the drill string is slightly out of position. Since the cut-outs 73 are aligned with the drill rods 60, the sprocket wheel insures that the drill rods are in exact alignment with the existing drill string. At this time the rotary drilling head is brought down and is secured to the threaded portion 65 of one of the drill rods. The rotary drilling head with a drill rod attached is then raised a certain distance until the reduced diameter portion 61 is aligned with the cut-out 47 (FIG. 5). At this time the lower hex end of the drill rods has been removed from its cup 31, and the drill rod is free to be removed from the "Lazy Susan." Thus it can be seen that the removal of the drill rod from the "Lazy Susan" is controlled solely by the position of the drill rod in relation to the retainer 45 and the cups 31. At the same time, the pin 79 is removed by hand or some suitable mechanical device from the holes 74 in the indexing wheel 71. Fluid under pressure is supplied to the cylinder 75 to retracted piston 77. The full stroke of the piston 77 moves the ball 78 to the next opening 74, i.e., the position shown in FIG. 2. The pin 79 is then dropped through the hole 74 and ball 78. Fluid under pressure is then supplied to the cylinder 18 to retracted piston 19 and swing the carriage or "Lazy Susan" 90° clockdwise. As the carriage is swung 90° clockwise, the plate 45 as well as the rest of the carriage swings free of the drill rod attached to the drilling head. Thus, the drill rod held by the rotary head 3 remains aligned with the existing drill string. The rotary drilling head is then lowered so that the lower end of the drill rod 60 contacts the drill string and the two parts are secured together. Drilling is then continued. While drilling is proceeding, fluid under pressure is supplied to the cylinder 75 to extend piston rod 77 and rotate the sprocket wheel 71 and "Lazy Susan" counterclockise so that the next rod is in position.

The sprocket wheel or indexing wheel 71 serves several functions. The primary functions are to rotate the "Lazy Susan" a predetermined amount so that each rod on the rack is in the proper position and to positively align one of the drill rods on the rack with the longitudinal axis of the hole being drilled or the existing drill string. By "positively aligning" one of the drill rods with the hole being drilled, I mean that the index wheel engages the existing drill string to prevent further swinging and rotative movement of the "Lazy Susan." Rotation of the indexing wheel is accomplished by advancing the piston 77 by applying fluid under pressure to the cylinder 75. The full stroke of the piston 77 rotates the indexing wheel and thus the entire "Lazy Susan" a distance equal to the circumferential distance between the longitudinal axes of adjacent drill rods. When the rack is swung into the position shown in FIG. 2, the cut-out 73 engages the upper end of the existing drill string. This insures proper alignment of a rod on the rack because each cut-out 73 is aligned with a rod on the rack. The base of the indexing wheel also provides a locking feature. This is accomplished by the circular cut-out 73 engaging the starter rod 4 and preventing the "Lazy Susan" from rotating as the piston 77 is retracted.

When the hole being drilled is completed, the rotary drilling head is used to raise the drill string. When one drill rod is completely out of the hole, suitable wrenches are used to remove that rod from the string. The rotary drilling head then raises the removed drill rod to the raised position. The carriage or drill rod rack is then swung into the rod changing position shown in FIG. 2 and the removed drill rod is received by the rod changer in the same manner in which it was removed from the rod changer (FIG. 5). The rotary drilling head then lowers the hex end of the drill rod into the cups 30.

It has been found that the connection between the threads on the drill rod and the rotary drilling head often becomes so tight that the torque of the rotary motor in the drilling head is unable to break the connection. With prior drill rod changers, an operator often must use a wrench or other tools which are part of the changer to break the connection. With this invention, I have provided apparatus which eliminates the necessity of additional components. The cups 31 are rotatably mounted on the plate 30 and provided with lobes 33. When the direction of rotation of the rotary drilling head is reversed to break the connection, the cup 31 rotates until the lobe 33 strikes a lobe on an adjacent cup. The contact between the two lobes creates sufficient impact to break the connection without stalling the rotary motor. These lobes also insure a secure connection between the drill rod and the rotary drilling head when rods are to be added to the drill string.

The rod changer of this invention allows additional rods to be added to the "Lazy Susan" as drilling progresses. This can be readily seen from viewing FIG. 3. There is provided near the drill tower 1 a hoist (not shown). This hoist allows additional rods 85 to be taken from a spare rod rack 86, swung around and placed on the "Lazy Susan." This is accomplished by using the cut-out 42 in cover plate 40. This cut-out is positioned so that additional rods may be added or removed to the changer in the same manner that they are removed by the rotary drilling head. The principal difference being that a hoist is used instead of the rotary drilling head. This feature becomes important when unusually deep holes are to be drilled.

This invention allows a more compact transportation position and eliminates the necessity of removing a starter rod from the rotary drilling head when moving from one location to another. To place the apparatus in transportation position, the "Lazy Susan" is rotated so that the cut-outs 34, 51 and 45 are aligned with each other. The carriage is then rotated 90° to the position shown in FIG. 2. In this position the starter rod 4 fits into the carriage along the cut-outs 34, 51 and 43. The drill tower and rod storing apparatus are then placed in a horizontal position and the drilling apparatus is ready to be transported. With this cut-out feature, the starter rod can be left on the rotary drilling head and a compact transportation position is still achieved. With the prior apparatus of this type, the starter rod had to be removed and placed on the rack. Thus, the present invention allows an additional drill rod to be carried by the changer and eliminates one step in drilling a hole. Should the rod changer of this invention be used for drilling only vertical holes, it is balanced so that the swinging cylinder 18 can be eliminated and the changer swung by hand. The piston cylinder arrangement for rotating the sprocket wheel 71 could be replaced by suitable mechanical linkages.

In FIG. 6 I have shown apparatus for retaining all of the drill rods in the changer during transportation. As should be readily apparent during transportation the rods will have a tendency to move forward. Most of the rods will contact the cover plate 40 and will not tend to slide out of the rack. However, one of the drill rods will, by necessity, be aligned with the cut-out 42 in the cover plate 40. Therefore, nothing will prevent the rod in this position from sliding forward and coming loose. To prevent this I have provided a rod holder lock generally indicated at 90 having a cane end 92. A handle 93 may be secured to lock 90 to facilitate handling. The position of the rod holder lock 90 during transportation is such that it is held in place by its own weight. To use the rod holder lock the cane end 92 is placed around a reduced diameter portion 64 of one of the drill rods. The lock means is then slid through a guide 91 which forces the locking means 90 towards the drill rod which is adjacent the cut-out 42. The outer end of the locking means 90 then engages the reduced diameter portion 64 of the drill rod adjacent the cut-out 42. The drill rod adjacent the cut-out 42 cannot move because it is connected through lock 90 to another drill rod which cannot slide forward because it strikes the cover 40.

Although I have described but a single preferred embodiment, it is intended that this invention be limited only by that which is within the scope of the appended claims.

I claim:

1. For use in combination with a drilling apparatus having a drill tower, a drill tool for forming a hole and a rotary drilling head mounted on said drill tower, said drill tool adapted to have a drill string connected thereto which will follow the drill tool down the hole, a device for storing and handling drill rods comprising:

a support swingably mounted on said drill tower;

a rack mounted on said support for holding a plurality of drill rods parallel to said drill tower and rotatable around its own axis; and indexing means for rotating said rack a predetermined amount and for engaging the drill string connected to said drill tool to positively align one of the drill rods on said rack with the drill string connected to said drill tool.

2. The combination of claim 1 wherein said drill rods are placed on said rack in a circular path and said indexing means includes a sprocket wheel and means for rotating said sprocket wheel a distance equal to the circumferential spacing between the longitudinal axes of adjacent drill rods.

3. The combination of claim 2 wherein said rack comprises a lower plate having a plurality means for holding one end of a drill rod and an upper plate having a plurality of key-hole cutouts, each being adapted to receive the other end of a drill rod, said upper and lower plates having aligned cut-out portions to provide clearance for a drill rod mounted on the rotary drilling head.

4. The combination of claim 3 wherein said means for holding one end of a drill rod is rotatably mounted on said lower plate and means are provided for limiting the amount of rotation of said means for holding one end of a drill rod.

5. The combination of claim 3 wherein said indexing means is positioned below said lower plate.

6. The combination of claim 5 wherein said means for holding one end of a drill rod is a cup rotatably mounted on said lower plate each cup being adapted to receive a drill rod and provided with lobe means for limiting the amount of rotation of said cup relative to said plate.

7. The combination of claim 6 wherein said rack further includes a cover plate having a first cut-out aligned with the cut-out portions on said upper and lower plates and a second cut-out adapted to receive a drill rod to be added to said rack and said drilling apparatus includes means for adding additional drill rods on said rack.

8. The combination of claim 7 further including lock means for preventing at least one of said drill rods from coming off of said rack.

9. In combination, a substantially cylindrical drill rod having a bore therethrough and a portion at one end with an outer surface of noncircular cross section and a reduced diameter portion at its other end; and a support having means providing a non-circular opening for receiving the non-circular end portion of said drill rod and preventing said drill rod from rotating relative to said means providing a non-circular opening; said end portion of said one end of said drill rod being polygonal in shape and said drill rod having a reduced diameter portion adjacent said end portion.

10. The combination of claim 9 wherein said means includes a cup having a polygonal opening therein for receiving said end portion of said drill rod.

11. In combination with a device for storing and handling drill rods, apparatus for holding one end of the drill rods comprising:
   a support plate;
   cup means having a non-circular opening therein rotatably mounted on said support plate for holding one end of a drill rod; and
   means for limiting the amount of rotation of said cup means relative to said support plate.

12. The combination of claim 11 wherein there are a plurality of cups, one for each of a plurality of drill rods and said means for limiting rotation is a lobe on each of said cups adapted to engage an adjacent cup.

13. For use in combination with a drill rod storage apparatus which includes a support, first means mounted on said support for holding one end of a drill rod, and plate means mounted on said support having at least one keyhole cut-out therein for holding the other end of a drill rod, a drill rod comprising: an elongated member having a non-circular first end dimensioned to be held by the first means of the drill rod storage apparatus and a reduced diameter portion located near its other end and longitudinally spaced from said non-circular end by a distance such that when the drill rod is moved longitudinally relative to the storage apparatus a distance sufficient to free said non-circular end from the first means, the reduced diameter portion will be aligned with the keyhole cut-out in the plate means of the storage apparatus.

14. The drill rod of claim 13 further comprising a second reduced diameter portion located near said non-circular end.

References Cited

UNITED STATES PATENTS

| | | | |
|---|---|---|---|
| 815,299 | 3/1906 | Leyner | 173—104 |
| 2,043,442 | 6/1936 | McNeill | 173—104 X |
| 2,972,388 | 2/1961 | Thornburg | 175—52 |
| 3,025,918 | 3/1962 | Leven | 175—52 |
| 3,032,129 | 5/1962 | Fletcher et al. | 175—320 |
| 3,157,286 | 11/1964 | Gyongyosi | 175—52 X |
| 3,265,138 | 8/1966 | Alexander et al. | 175—85 X |
| 3,286,777 | 11/1966 | Gyongyosi | 175—52 |
| 3,336,991 | 8/1967 | Klem | 175—85 |

CHARLES E. O'CONNELL, Primary Examiner

R. E. FAVREAU, Assistant Examiner

U.S. Cl. X.R.

175—85